(12) United States Patent
Giacomelli et al.

(10) Patent No.: US 11,714,599 B2
(45) Date of Patent: Aug. 1, 2023

(54) METHOD OF BROWSING A RESOURCE THROUGH VOICE INTERACTION

(71) Applicant: MEDIAVOICE S.R.L., Rome (IT)

(72) Inventors: Fabrizio Giacomelli, Rome (IT); Pasquale Giantomaso, Rome (IT); Alexander Goythom Habte, Rome (IT); Nicolamaria Manes, Rome (IT)

(73) Assignee: Mediavoice S.R.L., Rome (IT)

( * ) Notice: Subject to any disclaimer, the term of this patent is extended or adjusted under 35 U.S.C. 154(b) by 0 days.

(21) Appl. No.: 17/606,691

(22) PCT Filed: Mar. 18, 2021

(86) PCT No.: PCT/IB2021/052261
§ 371 (c)(1),
(2) Date: Oct. 26, 2021

(87) PCT Pub. No.: WO2021/186377
PCT Pub. Date: Sep. 23, 2021

(65) Prior Publication Data
US 2023/0004345 A1    Jan. 5, 2023

(30) Foreign Application Priority Data

Mar. 18, 2020   (IT) .................. 102020000005716

(51) Int. Cl.
*G06F 3/16*    (2006.01)
*G06F 9/451*    (2018.01)
(Continued)

(52) U.S. Cl.
CPC ............ *G06F 3/167* (2013.01); *G06F 3/0482* (2013.01); *G06F 9/451* (2018.02); *G06F 40/211* (2020.01);
(Continued)

(58) Field of Classification Search
CPC ........ G06F 3/0482; G06F 3/167; G06F 9/451; G06F 40/211; G06F 40/268; G06F 40/30; G06N 3/08; G09B 21/006
See application file for complete search history.

(56) References Cited

U.S. PATENT DOCUMENTS 5,884,262 A * 3/1999 Wise ..................... H04M 3/493
                                                            704/271
6,633,855 B1 * 10/2003 Auvenshine ............ G06F 16/00
                                                            706/15
(Continued)

FOREIGN PATENT DOCUMENTS

CA    3050378 A1 *  1/2020  ........... G06F 16/635
EP    3246828 A1 * 11/2017  ......... G06F 16/2246
(Continued)

OTHER PUBLICATIONS

Gogar et al. Deep Neural Networks for Web Page Information Extraction. Published by Springer International Publishing Switzerland 2016. All Rights Reserved L. Iliadis and I. Maglogiannis (Eds.): AIAI 2016, IFIP AICT 475, pp. 154-163, 2016. DOI: 10.1007/978-3-319-44944-9_14. (Year: 2016).*
(Continued)

*Primary Examiner* — Amy M Levy
(74) *Attorney, Agent, or Firm* — Loza & Loza, LLP (57) ABSTRACT

Computer-implemented method of browsing a resource through voice interaction comprising the following steps: A. acquiring (100) from a user a request aimed at browsing a resource; B. downloading (130) the requested resource; C. performing a syntactic parsing (135) of the downloaded resource; D. extracting (150) from the downloaded resource one or more lists, if any, of selectable shortcuts pointing to portions inside or outside the downloaded resource through a syntactic analysis and/or a semantic analysis and/or a
(Continued)

morphological-visual analysis of extraction of lists of selectable shortcuts on the basis of an ontology (245) corresponding to the type of resource; E. on the basis of the ontology (245) corresponding to the type of resource, building (225) a list of one or more lists of selectable shortcuts extracted in step D ordered according to a list prioritisation; F. extracting (150) from the downloaded resource one or more content elements through a syntactic analysis and/or a semantic analysis and/or a morphological-visual analysis of extraction of content elements on the basis of the ontology (245) corresponding to the type of resource; G. on the basis of the ontology (245) corresponding to the type of resource, building (290) a list of content elements extracted in step F ordered according to a content element prioritisation; H. on the basis of the lists built in steps E and G and on the basis of the ontology (245) corresponding to the type of resource, building a final structure of lists of selectable shortcuts and of content elements; I. playing (125) a voice prompt based on the final structure and starting a voice interaction with the user for browsing the resource.

14 Claims, 3 Drawing Sheets

(51) Int. Cl.
| | | |
|---|---|---|
| *G06F 40/211* | (2020.01) | |
| *G06F 40/268* | (2020.01) | |
| *G06F 40/30* | (2020.01) | |
| *G06F 3/0482* | (2013.01) | |
| *G06N 3/08* | (2023.01) | |
| *G09B 21/00* | (2006.01) | |

(52) U.S. Cl.
CPC ............ *G06F 40/268* (2020.01); *G06F 40/30* (2020.01); *G06N 3/08* (2013.01); *G09B 21/006* (2013.01)

(56) References Cited

U.S. PATENT DOCUMENTS

| | | | | |
|---|---|---|---|---|
| 6,941,509 | B2* | 9/2005 | Harris | G06F 16/9577 715/201 |
| 7,058,887 | B2* | 6/2006 | Cragun | G10L 13/08 704/270.1 |
| 7,219,136 | B1* | 5/2007 | Danner | G06Q 20/16 709/224 |
| 7,395,498 | B2* | 7/2008 | Katayama | G06F 16/30 707/E17.058 |
| 7,881,941 | B2* | 2/2011 | Kurganov | G10L 15/193 704/275 |
| 8,595,016 | B2* | 11/2013 | Van Sciver | G10L 15/22 704/275 |
| 9,087,507 | B2* | 7/2015 | Sengamedu | G10L 13/00 |
| 10,664,229 | B2* | 5/2020 | Cheng | G06F 16/245 |
| 10,938,952 | B2* | 3/2021 | Moon | H04L 67/02 |
| 2004/0128136 | A1 | 7/2004 | Irani | |
| 2004/0218451 | A1 | 11/2004 | Said et al. | |
| 2007/0130125 | A1* | 6/2007 | Holte | G06F 16/954 |
| 2009/0089293 | A1* | 4/2009 | Garritano | G06F 16/358 |
| 2010/0082673 | A1* | 4/2010 | Nakano | G06F 16/957 707/E17.014 |
| 2013/0275164 | A1* | 10/2013 | Gruber | G10L 17/22 705/5 |
| 2014/0047337 | A1 | 2/2014 | Bradley et al. | |
| 2015/0278192 | A1* | 10/2015 | Bretter | G10L 15/00 704/9 |
| 2019/0236137 | A1* | 8/2019 | Hesketh | G06F 16/9535 |
| 2019/0354262 | A1* | 11/2019 | Bradley | G06F 40/14 |
| 2020/0073921 | A1* | 3/2020 | Bradley | G06F 40/174 |
| 2020/0183928 | A1* | 6/2020 | Wu | G06N 5/043 |

FOREIGN PATENT DOCUMENTS

| | | |
|---|---|---|
| EP | 3430619 A1 | 1/2019 |
| WO | 02073599 A1 | 9/2002 |

OTHER PUBLICATIONS

Auda et al. Modular Neural Networks: a Survey, International Journal of Neural Systems, vol. 9, No. 2 (Apr. 1999) pp. 129-151. (Year: 1999).*
Nguyen-Hoang et al. Genre-Oriented Web Content Extraction with Deep Convolutional Neural Networks and Statistical Methods. 32nd Pacific Asia Conference on Language, Information and Computation Hong Kong, Dec. 1-3, 2018. Retrieved from [https://aclanthology.org/Y18-1055.pdf] on [Dec. 13, 2022] 10 pages (Year: 2018).*
Ramakrishnan et al. Non-visual Web Browsing: Beyond Web Accessibility. © Springer International Publishing AG 2017. M. Antona and C. Stephanidis (Eds.): UAHCI 2017, Part II, LNCS 10278, pp. 322-334, 2017. DOI: 10.1007/978-3-319-58703-5_24. (Year: 2017).*
Ashok et al. Web Screen Reading Automation Assistance Using Semantic Abstraction. IUI 2017, Mar. 13-16, 2017, Limassol, Cyprus. DOI: 10.1145/3025171.3025229. 12 pages. (Year: 2017).*
baez et al. Conversational Web Interaction: Proposal of a Dialog-Based Natural Language Interaction Paradigm for the Web. Springer Nature Switzerland AG 2020 A. Følstad et al. (Eds.): CONVERSATIONS 2019, LNCS 11970, pp. 94-110. [https://doi.org/10.1007/978-3-030-39540-7_7], (Year: 2020).*
International Search Report for application PCT/IB2021/052261, dated Jun. 29, 2021, 2 pages.
Xiaoming Zeng, "Evaluation and Enhancement of Web Content Accessibility for persons with Disabilities" Internet Citation, http://d-scholarship.pitt.edu/7311/1/XiaomingZeng_April2004.pdf, Apr. 16, 2004, pp. 1-173.
Ramakrishnan I V et al. "Bridging the Web Accessibility Divide", Electronic Notes in Theoretical Computer Science. Elsevier Amsterdam. N, vol. 235, Mar. 25, 2009, pp. 107-124.
Simon Harper et al: "SADIe: Structural Semantics for Accessibility and Device Independence", ACM Transactions on Computer-Human Interaction, vol. 14. No. 2., Aug. 1, 2007, 27 pages.
Andrew, Judith Jeyafreeda et al. "Web Page Segmentation for Non Visual Skimming", 2019, 9 pgs.
Bhardwaj, Aanshi et al. "A Novel Approach for Content Extraction from Web Pages", IEEE, Proceedings of 2014 RAECS UIET Panjab University Chandigarh, Mar. 6-8, 2014, 4 ps.
Hamidi, Foad et al. "Web-Speak: a customizable speech-based web navigation interface for people with disabilities", Jan. 2010, 5 pgs.
Kowalkiewicz, Marek et al. "myPortal: Robust Extraction and Aggregation of Web Content", VLDB '06, Sep. 12-15, 2006, pp. 1219-1222.
Malhotra, Pooja et al. "Web Page Segmentation Towards Information Extraction forWeb Semantics", International Conference on Innovative Computing and Communications, Lecture Notes in Networks and Systems 56, Springer Nature Singapore Pte Ltd. 2019, pp. 431-442.
Li, NA et al. "Ontology Completion Using Graph Convolutional Networks", ISWC 2019: 18th International Semantic Web Conference, Auckland, New Zealand, Oct. 26-30, 2019, pp. 435-452.
Peters, Matthew E. et al. "Content Extraction Using Diverse Feature Sets", WWW2013 Companion, May 13-17, 2013, pp. 89-90.
Poon, Josiah et al. "Browsing the Web from a Speech-Based Interface", Proc. of Human-Computer Interaction (INTERACT'01), Jul. 9-13, 2001, Tokyo, Japan, (2001), pp. 302-309.
Presutti, Valentina et al. "Content Ontology Design Patterns as Practical Building Blocks for Web Ontologies", LNCS5231, (2008), pp. 128-141.
Suhan, Pan et al. "An Effective Method to Extract Web Content Information", Journal of Software, vol. 13, No. 11, Nov. 2018, pp. 621-629.
Tanvi, Varma, "Web Page Segmentation: a Survey", International Journal of Engineering Research & Technology (IJERT), vol. 1, issue 10, Dec. 2012, 4 pgs.

(56) References Cited

OTHER PUBLICATIONS

Yunis, Hamza, "Content Extraction from Webpages Using Machine Learning", Master's Thesis, Matriculation No. 115233, Dec. 16, 2016, 67 pgs.

* cited by examiner

METHOD OF BROWSING A RESOURCE THROUGH VOICE INTERACTION

The present invention relates to a method, that is computer-implemented, of browsing a resource, such as for instance a website or a web page, a document or an app, through voice interaction, that allows a user, in particular, also if not necessarily, a blind or visually impaired user, to enjoy in a simple, fast, reliable, efficient and inexpensive way the maximum freedom of choice between the various browsing options without the need for any visual perception by the user, while maintaining a high level of conceptualization of the voice communication between the reached (and reachable) resource and the user himself/herself.

The present invention further relates to a system and a device configured to perform such method of browsing a resource through voice interaction.

In the following of the present description, reference will mainly be made to an application of the method and the apparatus according to the invention for blind or visually impaired users. However, it should be noted that the method and the apparatus according to the invention can also be used by non-disabled users who nevertheless are in situations in which they cannot visually perceive the screen of a computer or other processing device (e.g. a smartphone or tablet), for example while driving a vehicle (in this case, the screen of the vehicle's on-board computer or other processing device, such as a smartphone or tablet, could also be automatically darkened to prevent the user from distracting attention from the road).

Also, in the following of the present description, reference will be mainly made to an application of the method according to the invention to a PC equipped with a screen. However, it should be noted that the method according to the invention can also be applied to different processing devices equipped with screens (i.e. it can be implemented and executed by them), such as computers different from PCs, smartphones and tablets, still remaining within the scope of protection of the present invention.

Furthermore, in the following of the present description, reference will be mainly made to a website or web page as a resource to be browsed. However, it it should be noted that the computer-implemented method according to the invention permits to browse any resource, where in the present description and in the attached claims, in addition to a website or a web page, also a program or an application (e.g., a mail program such as Outlook®) or a document in any file format, such as a text document (e.g. Word®), a spreadsheet (e.g. Excel®), a presentation (e.g. Powerpoint®), an image is meant with resource.

In the field of information technology, all those technologies specifically designed to make the IT (hardware and/or software) products themselves accessible and usable even to people with disabilities are called assistive technologies. Many of these concern man-machine interfaces made after the initial product conceived for non-disabled users, i.e. that requires a significant visual perception by the user, and, as a consequence of their sophisticated design, implementation and low economy of scale, they tend to be technologies extremely expensive for the end user, who is possibly disabled.

The prior art assistive technologies dedicated to the use of the Internet without the need for any visual perception by the user include screen readers, braille keyboards for the blind, special mouse pointers and much more.

Screen readers are the most spread aids for blind or visually impaired users as they allow the user, who cannot visually perceive what is shown on a screen, to have control of the PC operating system, on the basis of the transformation of the text appearing on the screen into voice.

In particular, users who have technical competences use many software applications to browse the elements and functionalities of a computer and of the operating system, elements on web pages and all elements of a GUI (Graphical User Interface) shown on the screen of the computer or other processing device.

The technologies underlying these softwares and in particular the screen readers are mainly based on the accessibility features offered by operating systems such as Windows or Linux and the use of speech synthesis engines to read the text or description associated with the selected element.

In this regard, it is known that speech technology substantially consists of two distinct and complementary technologies: Speech Recognition or ASR (Automatic Speech Recognition), and Speech Synthesis or TTS (Text To Speech). ASR technology permits the recognition of the user's speech by a computer, equipped with a microphone and audio electronic devices and an appropriate computer program, or software. Electronic audio devices transduce the sounds of spoken words which reach the microphone into electrical signals which are interpreted by the software as corresponding character strings. Instead, TTS technology consists of the opposite operation, in which a computer, equipped with an appropriate software, electronic audio devices and a loudspeaker, performs transduction of words from a stored text into sounds, into spoken words. The software modules which perform speech recognition and speech synthesis operations are called speech engines. Thus, there exist speech recognition and speech synthesis engines.

Some of the most widely used prior art screen readers are Jaws® available from Freedom Scientific Inc., WindowEyes available from GW-Micro, Hal for Windows available from Dolphin Computer Access Ltd., and NVDA available from NV Access. Also in the world of mobile technologies screen reader software have spread such as TalkBack available from Google LLC and Voice Over available from Apple Inc., in addition to generalist voice assistants for mobile devices such as Siri available from Apple Inc., Google Assistant available from Google LLC, and Cortana available from Microsoft Corporation.

In the prior art, sonic Voice Browsers have been developed which allow Internet browsing to blind users, such as those described by X. Zeng in "Evaluation and enhancement of web content accessibility for persons with disabilities", 1 Jan. 2004, pp. 1-173, downloadable from the Internet d-scholarship.pittedu, and by I.V. Ramakrishnan et al. in "Bridging the Web Accessibility Divide", Electronic Notes in Theoretical Computer Science, Elsevier, Amsterdam, NL, vol. 235, 1 Apr. 2009, pp. 107-124, and in documents WO2/073599 A1, US 20040128136 A1, US20040218451 A1, US20140047337 A1, and EP3430619 A1.

Furthermore, some scientific studies have been carried out always in relation to Voice Browsers, as described for example by Foad Hamidi et al. in Web-speak: a customizable speech-based web navigation interface for people with disabilities, 2010, ResearchGate (researchgate.net), by Josiah Poon et al., Browsing the Web from a Speech-Based Interface, 2001. School of CSEE, U, Of Queensland, Australia. In particular, most of these studies have focused on the extraction of contents from a website or web page, as described for example by Hamza Yunis, in Content Extraction from Webpages Using Machine Learning, 2016, Master's Thesis, Bauhaus-Universitat Weimar (webis.de), that further describes an analysis related to noise reduction, i.e. to the optimization induced in the web pages and their management (starting from the download), for example in relation to the advertising contents contained therein which are managed separately from other contents, e.g. eliminating advertising, and by Marek Kowalkiewicz et al. in *myPortal: Robust Extraction and Aggregation of Web Content*, 2006, VLDB Endowment, ACM L-59593-385-9/06/09, by Matthew E. Peters et al. in *Content Extraction Using Diverse Feature Sets*, 2013, WWW 2013 Companion, Rio de Janeiro, Brazil, ACM 978-1-4503-2038-2/13/05, by Aanshi Bhardwaj et al. in *A novel Approach for Content Extraction from Web Pages*, 2014, Proceedings of 2014 RAECSd UIET Panjab University Chandigarh, 978-1-4799-2291-8, and by Pan Suhan et al. in *An Effective Method to Extract Web Content Information*, 2018, College of Information Engineering, Yangzhou University, Yangzhou, China. Doi: 10.17706/jsw.13.11.621-629. Other similar studies have focused on particular aspects of content extraction in general, such as:

- Page Segmentation for the extraction of contents from the web, as described by Varma Tanvi in *Web Page Segmentation: A Survey*, 2012, International Journal of Engineering Research & Technology (IJERT), ISSN: 2278-0181, by Pooja Malhotra et al. in Web Page Segmentation Towards Information Extraction for Web Semantics, in S. Bhattacharyya et al. (eds.), *International Conference on Innovative Computing and Communications*, Lecture Notes in Networks and Systems 56. Springer Nature Singapore Pte Ltd. 2019, and by Judith Andrew et al. in *Web Page Segmentation for Non Visual Skimming*, the 33$^{rd}$ Pacific Asia Conference on Language, Information and computation (PACLIC33), September 2019, Hakodate, Japan. Hal-02309625; and
- ontology and the web, as described by Valentina Presutti et al. in *Content Ontology Design Patterns as Practical Building Blocks for Web Ontologies*, 2008, ISTC-CNR, Semantic Technology Lab, Italy, and by Na Li et al. (with reference to convolutional networks) in *Ontology Completion Using Graph Convolutional Networks*, in The Semantic Web. 18th International Semantic Web Conference 2019, Proceedings, Part I.

However, prior art screen readers and Voice Browsers suffer from some drawbacks.

First of all, they are suitable only for users, possibly blind or visually impaired, who are skilled in the use of PCs and keyboards, which are the only means for interacting with them.

Also, in order to browse a website through the prior art screen readers and Voice Browsers, the user listens to the speech synthesis that recites the links and the contents on which the blind or visually impaired user places the focus by means of the directional keys. This implies that the prior art screen readers have a sequential approach, consequently very slow, tedious, frustrating and unsatisfactory for users.

Furthermore, the prior art generalist voice assistants do not fully solve the problem of accessibility and usability of web services especially for blind and visually impaired users, since they try to interpret the activity requested by the user and in most of the cases they carry out a simple search on the web, without establishing a real dialogue with the user. In other words, these generalist voice assistants are limited to activating the application or browsing the web page considered the solution closest to the request made by the user, without making the dialogue evolve and without interacting with the contents of the page in a structured and precise manner, i.e. they do not permit a subsequent interaction to complete the activity until its completion as requested by the user.

Finally, prior art screen readers and Voice Browsers are complex and usually limited to browsing a single resource, in particular Internet browsing or the use of a specific software program.

The object of the present invention is therefore to allow a user, in particular, although not necessarily, a blind or visually impaired user, to browse a resource through voice interaction, without the need for any visual perception by the user, in a simple, fast, reliable, efficient and inexpensive way.

It is specific subject-matter of the present invention a computer-implemented method of browsing a resource through voice interaction comprising the following steps:

A. acquiring from a user a request aimed at browsing a resource;
B. downloading the requested resource;
C. performing a syntactic parsing of the downloaded resource;
D. extracting from the downloaded resource one or more lists, if any, of selectable shortcuts pointing to portions inside or outside the downloaded resource through at least one analysis of extraction of lists of selectable shortcuts of the downloaded resource selected from the group comprising a syntactic analysis of extraction of lists of selectable shortcuts, a semantic analysis of extraction of lists of selectable shortcuts and a morphological-visual analysis of extraction of lists of selectable shortcuts, wherein said at least one analysis of extraction of lists of selectable shortcuts of the downloaded resource is performed on the basis of an ontology corresponding to the type of resource provided by a resource type detector module;
E. on the basis of the ontology corresponding to the type of resource provided by the resource type detector module, building a list comprising one or more of said one or more lists, if any, of selectable shortcuts extracted in step D from the downloaded resource, wherein said one or more lists of selectable shortcuts are ordered in the list according to a list prioritisation;
F. extracting from the downloaded resource one or more one or more content elements, if any, different from lists of selectable shortcuts pointing to portions inside or outside the downloaded resource through at least one analysis of extraction of content elements of the downloaded resource selected from the group comprising a syntactic analysis of extraction of content elements, a semantic analysis of extraction of content elements and a morphological-visual analysis of extraction of content elements, wherein said at least one analysis of content elements of the downloaded resource is performed on the basis of the ontology corresponding to the type of resource provided by the resource type detector module;
G. on the basis of the ontology corresponding to the type of resource provided by the resource type detector module, building a list comprising one or more of said one or more content elements, if any, extracted in step F from the downloaded resource, wherein said one or more content elements are ordered in the list according to a content element prioritisation;
H. on the basis of the list of one or more lists of selectable shortcuts built in step E and of the list of one or more content elements built in step G, and on the basis of the ontology corresponding to the type of resource provided by a resource type detector module, building a final structure of lists of selectable shortcuts and of content elements;

I. playing a voice prompt based on the final structure of lists of selectable shortcuts and of content elements and starting a voice interaction with the user for browsing the resource. According to another aspect of the invention, the method may provide that in step D:

said syntactic analysis of extraction of lists of selectable shortcuts is performed through a neural network for syntactic detection of lists of selectable shortcuts, said semantic analysis of extraction of lists of selectable shortcuts is performed through a neural network for semantic detection of lists of selectable shortcuts, and said morphological-visual analysis of extraction of lists of selectable shortcuts is performed through a neural network for morphological-visual detection of lists of selectable shortcuts, and in step F:

said syntactic analysis of extraction of content elements is performed through a neural network for syntactic detection of content elements, said semantic analysis of extraction of content elements is performed through a neural network for semantic detection of content elements, and said morphological-visual analysis of extraction of content elements is performed through a neural network for morphological-visual detection of content elements.

According to a further aspect of the invention, the method may provide that:

said one or more lists extracted in step D are filtered through at least one analysis of filtering of lists of selectable shortcuts of the downloaded resource selected from the group comprising a syntactic analysis of filtering of lists of selectable shortcuts, a semantic analysis of filtering of lists of selectable shortcuts and a morphological-visual analysis of filtering of lists of selectable shortcuts, wherein said at least one analysis of filtering of lists of selectable shortcuts of the downloaded resource is performed on the basis of an ontology corresponding to the type of resource provided by the resource type detector module; and said one or more content elements extracted in step F are filtered through at least one analysis of filtering of content elements of the downloaded resource selected from the group comprising a syntactic analysis of filtering of content elements, a semantic analysis of filtering of content elements and a morphological-visual analysis of filtering of content elements, wherein said at least one analysis of filtering of content elements of the downloaded resource is performed on the basis of an ontology corresponding to the type of resource provided by the resource type detector module.

According to an additional aspect of the invention, the method may provide that in step D:

said syntactic analysis of filtering of lists of selectable shortcuts is performed through a neural network for syntactic filtering of lists of selectable shortcuts, said semantic analysis of filtering of lists of selectable shortcuts is performed through a neural network for semantic filtering of lists of selectable shortcuts, and said morphological-visual analysis of filtering of lists of selectable shortcuts is performed through a neural network for morphological-visual filtering of lists of selectable shortcuts, and in step F:

said syntactic analysis of filtering of content elements is performed through a neural network of syntactic filtering of content elements, said semantic analysis of filtering of content elements is performed through a neural network of semantic filtering of content elements, and said morphological-visual analysis of filtering of content elements is performed through a neural network of morphological-visual filtering of content elements.

According to another aspect of the invention, the method may provide that:

the resource type detector module receives in step C a first identification of the type of resource, in step D, in the case where said at least one analysis of extraction of lists of selectable shortcuts of the downloaded resource recognises that said first identification is wrong, the resource type detector module receives a second identification of the type of resource, and execution of step D is repeated, wherein said at least one analysis of extraction of lists of selectable shortcuts of the downloaded resource is performed on the basis of the ontology corresponding to the second identification of the type of resource, and in step F, in the case where the resource type detector module has not received a second identification of the type of resource and said at least one analysis of extraction of content elements of the downloaded resource recognises that said first identification is wrong, or in the case where the resource type detector module has received a second identification of the type of resource and said at least one analysis of extraction of content elements of the downloaded resource recognises that said second identification is wrong, the resource type detector module receives a third identification of the type of resource, and both execution of step D, wherein said at least one analysis of extraction of lists of selectable shortcuts of the downloaded resource is performed on the basis of the ontology corresponding to the third identification of the type of resource, and execution of step F, wherein said at least one analysis of extraction of content elements of the downloaded resource is performed on the basis of the ontology corresponding to the third identification of the type of resource.

According to a further aspect of the invention, the method may provide that, in the case where in step C a main list of selectable shortcuts is identified on the basis of a syntactic self-declaration, in step E the list (namely, the list of lists) comprising one or more lists di selectable shortcuts is built including said main list of selectable shortcuts identified in step C as main list of selectable shortcuts.

According to an additional aspect of the invention, the method may provide that, in step B, it is checked whether the downloaded resource has been browsed in a time interval preceding the request acquired in step A and:

if yes, the method loads the final structure of lists of selectable shortcuts and of content elements previously built for said downloaded resource and skips to step I, otherwise if not, the method proceeds to step C.

According to another aspect of the invention, the method may provide that immediately after step B spurious elements, if any, are eliminated from the resource and wherein between step C and step D multimedia elements, if any, are managed by a Multimedia_Detector/Manager module.

According to a further aspect of the invention, the method may provide that in step A the request aimed at browsing a resource is analysed and, if the method recognises that it needs additional information, the method institutes a dialogue with the user to obtain said additional information.

According to an additional aspect of the invention, the method may provide that step I is performed taking account of information stored in a user profile, optionally for a user voice recognition.

According to another aspect of the invention, the method may provide that between step A and step B a search of the requested resource, optionally stored in a user profile, is performed.

According to an additional aspect of the invention, the search of the requested resource may be stored in a user profile.

According to a further aspect of the invention, the resource may be selected from the group comprising:
- a web page, thereby the lists of selectable shortcuts pointing to portions inside or outside the downloaded resource consist of menus of the web page and the content elements are non-menu contents of the web page;
- a document, thereby the lists of selectable shortcuts pointing to portions inside or outside the downloaded resource consist of indexes or summaries of the document; and
- an app.

It is still specific subject-matter of the present invention a system comprising a processing device, provided with microphone and at least one electronic audio playing device, and one or more servers, optionally one or more cloud servers, with which the processing device is configured to connect, wherein the processing device and/or said one or more servers are configured to perform the computer-implemented method of browsing a resource through voice interaction as previously described.

It is further specific subject-matter of the present invention a set of one or more computer programs comprising instructions which, when executed by one or more processing units, cause said one or more processing units to carry out the computer-implemented method of browsing a resource through voice interaction as previously described.

It is an additional specific subject-matter of the present invention a set of one or more computer-readable storage media having stored thereon the set of one or more computer programs just described.

The computer-implemented method of browsing a resource through voice interaction implements a voice browser, based on a full voice interface (i.e., that speaks and listens) and artificial intelligence, that allows to browse with the voice any resource, such as a website or a web page, a document or an app, thanks to an automatic syntactic and/or semantic and/or morphological-visual extraction of its elements, for example menus and non-menu contents. Such voice browser is able to guide and vocally perform all the activities which lead to the conclusion of a specific task requested by a user, and in particular to guide the user to the use of all the significant parts relating to the contents and services present on a resource (e.g. an entire website or within any web page), through an organized and structured logical voice navigation depending on the contents and services present within the resource itself (e.g. the web page).

In particular, the computer-implemented method of browsing a resource through voice interaction carries out a voice interaction with users, possibly blind and visually impaired, that is accurate from the point of view of semantic quality, that allows to correctly address situations of ambiguity and is reliable in the response and information provided as well as in the legibility and perception of naturalness of the interaction established with the user.

The voice browser implemented by the method according to the invention is a tool that allows a user, in particular with visual disabilities, a simple and fast browsing within a resource, e.g. a web page, allowing him to browse within the resource in an "intelligent" way with the simple aid of voice interaction, based on the extraction of the elements within each resource so as to provide them clearly to the user himself/herself. This means that such voice browser is particularly indicated for users who have accessibility needs, permitting to access even those resources in which the prior art screen readers struggle to move easily due to a bad implementation, such as websites or web pages in which assistive technologies are rendered unusable by an inadequate structure that does not respect accessibility rules. In this regard, the combination of simplicity and speed makes the browsing experience for the user, possibly blind or visually impaired, fully satisfactory, avoiding situations of frustration due to the access to resources, e.g. websites, poorly structured, and also it makes any resource accessible to everyone, even to those users who do not want to or cannot learn manuals and technical guides of the current screen readers, as the interaction can also take place only with the use of the voice.

By way of example, some embodiments of the method according to the invention manage some short cuts for the rapid scrolling of a web page, such as requesting the list of links or titles within a section of the page. In this case, the user has at his/her disposal a simple means such as voice commands, but also the possibility of quickly scrolling using the arrows of a remote control (with which the apparatus according to the invention is configured to interact) between the elements of the web page.

The present invention will be now described, for illustrative but not limiting purposes, according to its preferred embodiments, with particular reference to the Figures of the attached drawings, in which.

In the Figures identical reference numerals will be used for alike elements.

The preferred embodiment of the computer-implemented method and of the system according to the invention which permit to browse a website or web page by voice interaction is illustrated in the following. Other embodiments that allow browsing through voice interaction of a resource, different from a website or web page such as for example a program or an application (e.g., a mail program such as Outlook®) or a document in any file format, such as a text document (e.g. Word®), a spreadsheet (e.g. Excel®), a presentation (e.g. Powerpoint®), an image, have similar technical features.

The preferred embodiment of the method according to the invention is performed (i.e. implemented) through a processing device (such as a computer, a personal computer, a smartphone or a tablet) or a system of which the processing device is part (for example in a cloud architecture), wherein the processing device is equipped with a screen, speakers and microphone, wherein the microphone can also be incorporated into a remote control configured to communicate with the processing device (such as the Speaky Facile® remote control of Mediavoice s.r.l.—see www.mediavoice.it—that is configured to communicate with a personal computer).

The preferred embodiment of the method according to the invention receives an initial request from the user related to the web page (or website) to be browsed, searches and downloads the requested web page, analyses it through artificial intelligence identifying menus, if present, and non-menu contents, if present, thereof and finally interacts with the user through voice interaction allowing him to use and browse the requested web page.

Figure 1:
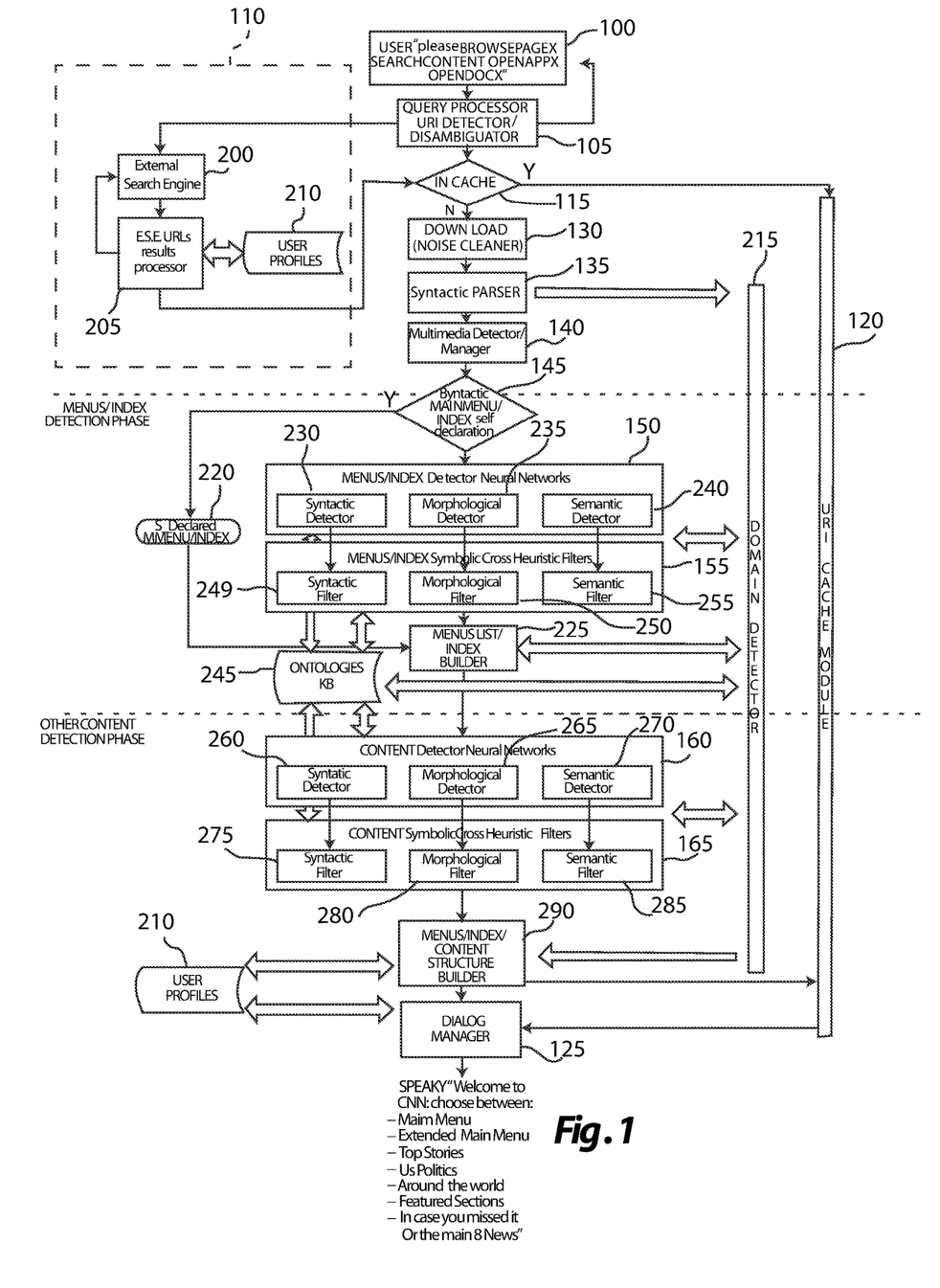
FIG. 1 shows a schematic flow chart of a preferred embodiment of the computer-implemented method of browsing a resource through voice interaction according to the invention.

FIG. 1 shows a schematic flow chart of the preferred embodiment of the computer-implemented method according to the invention. Through the microphone of the processing device, the method according to the invention acquires (100) as input a browsing request from the user, e.g., "go to site x", "see site x", "browse x", and the like. Advantageously, the user pronounces, with a natural voice, a question and/or a statement (which constitute a request aimed at browsing), in order to request to browse a web page or a specific website. Through its own ASR module that processes the sound signal acquired by the microphone, the method analyses (105) the browsing request pronounced by the user and, if it recognises that it has all the necessary information, it carries out the search for the web page or website. Otherwise, if the method recognises that it still needs additional information, it establishes a dialogue with the user using the TTS and ASR modules. In particular, the acquired request is broken down into preambles (if present), web page or website name and postambles (if present), possibly carrying out an interaction with the user for the purpose of domain disambiguation (.it, .com, .net etc.).

Other embodiments of the method according to the invention, in which the resource to be browsed is different, such as, for example, a document or an app, operate in a similar way. By way of example, to browse an app the acquired request can be "open app x" or the like, to browse a document the acquired request can be "open document x" or the like. In this case, the acquired request is broken down into preambles (if present), app or document name and postambles (if present), possibly carrying out an interaction with the user for the purpose of disambiguation, for example, in the case of documents, of disambiguation on the type of document (doc, pdf, txt, etc.).

To carry out the search (110), the method according to the invention uses an external search engine 200 and a processor 205 for its results which identifies a URI (Uniform Resource Identifier) of the resource, that in the preferred embodiment of the method according to the invention consists of a Uniform Resource Locator (URL). Advantageously, the search carried out for the specific user is stored in a user profile 210 (preferably identified through its own credentials with which the user has started the computer-implemented method on the processing device).

Other embodiments of the method according to the invention, in which the resource to be browsed is different, such as, for example, a document or an app, operate in a similar way, and in this case the URI consists of a URN (Uniform Resource Name), e.g. the name of the document.

Subsequently, the method checks (115) whether the requested resource identified by the URI, that in the preferred embodiment is the web page identified by the URL, has been in the cache of the processing device with which the user interacts for no more than a maximum period of time, i.e. if it has been browsed in the recent past, namely in a specific time interval prior to the request that can be optionally set, more optionally depending on the type of website (e.g., 2 hours for a news website and 1 day for a video game website). In the following of the present description, the "website type" is also referred to as "domain type", and this definition has no relation to the DNS domain name system, thereby it must not be confused, for example, with the type of domain name, e.g. with the TLD (Top Level Domain).

In the positive, i.e. if the web page identified by the URL has been in the cache of the processing device for no more than a maximum period of time, the method downloads (120) what is stored in the cache of the processing device for that URL and delivers (125) directly the related prompt voice, already prepared and stored by the analysis carried out during the preceding browsing of the web page identified by the URL that occurred within said maximum period of time, starting a voice interaction with the user to browse the web page.

Alternatively in the negative case, i.e. if the web page identified by the URL is not in the cache of the processing device or has been present there for more than the maximum time period, the method downloads the web page (130) and proceeds with the steps of analysis of its content.

Advantageously, immediately after the download (130) of the web page, the method eliminates possible spurious elements from the resource, such as for example the advertising contents. Such elimination in the case of a web page can occur either by deleting "upstream" (i.e. before the completion of the download) such spurious contents in order to optimise the download time, or "downstream" (i.e. at the completion of the download), inhibiting the related code and not deleting it so as to leave the formatting of the web page, i.e. its morphological-visual structure, unaltered.

Subsequently, the method according to the invention performs a syntactic parsing (135) of the resource, i.e. of the web page, during which it identifies all its syntactic elements, including the syntactic self-declaration relating to the Main Menu. In this regard, also the embodiments of the method according to the invention in which the resource to be browsed is an app identify, among its syntactic elements, the Main Menu, while the embodiments of the method according to the invention in which the resource to be browsed is a document identify, instead of the Main Menu, a main index (or summary). In general, the method according to the invention identifies a main list of selectable shortcuts for pointing to portions inside or outside the resource downloaded with the download.

The syntactic parsing (135) of the resource also provides a domain detector module 215 with a first identification (e.g., as highest probability hypothesis) of the domain type to which such web page belongs, e.g. discriminating between information, transport, training, entertainment, e-commerce, etc. (thereby the domain type is identified within a set of domain types). In particular, for such first identification, the syntactic parsing (135) searches, through pattern matching, in the web page for a series of elements the presence of which is indicative and typical of a domain. By way of example, and not by way of limitation, a home page of a site repeatedly containing the word train and containing an input box "FROM", an input box "TO", an input box "Date", an input box "TIMETABLE" is most likely the home page of a rail transport site. In this regard, syntactic parsing (135) exploits a structure of analogous patterns for each domain type (e.g., sites for public administration, schools, hospitals, e-commerce, real estate, etc.), since each domain type has its specific features, such as keywords and patterns, and has its own specific ontology. Consequently, each domain type has its own pattern, its own ontology and some typical information slots (e.g., for a transport site "where do you start from" and "where do you go", for an e-commerce site "what type of product do you prefer?" and "What budget do you have?"). The syntactic parsing identifies the site type from the typical information slots (i.e. it reads the information present in the web page and deduces the domain type). For the recognition of the structure of the web page, the syntactic parsing carried out by the preferred embodiment of the method according to the invention is based on the construction and analysis of the DOM (Document Object Model) tree corresponding to the page itself, that is then analysed and possibly modified during the syntactic parsing performed by the method. This operation allows to extrapolate the web page tags and to assign them a meaning in the case where they do not already have an intrinsic one (as in some HTML5 tags). lithe syntactic parsing (135) of the resource fails to provide a first identification of the domain type to which such web page belongs (e.g., because the probability value of the highest probability is lower than a minimum reliability threshold), then as a first identification of the website type to which such web page belongs, the domain detector module 215 is provided with the "unknown" domain type; no ontology is associated with the "unknown" domain type.

Subsequently, all the Multimedia elements contained in the web page, such as Videos, Photographs, Audio and the like, are managed (140) by a Multimedia_Detector/Manager module based on conventional technology; by way of example, and not by way of limitation, the images are managed through an automatic descriptor currently available to the person skilled in the art.

Subsequently, the method performs an automatic syntactic-semantic-morphological extraction of menus, if any (or, more generally, of lists, if any, of selectable shortcuts pointing to portions inside or outside the resource; in the case where the resource is a document, these lists are indexes or summaries).

Such activity is carried out by a triple subsystem of interconnected neural networks, each of which investigates the syntactic, semantic and morphological-visual structure, respectively, of the resource (that in the illustrated preferred embodiment is a web page).

In particular, the method checks (145) that the Main Menu has been already identified during the syntactic parsing (135) of the resource (i.e. on the basis of the syntactic self-declaration related to the Main Menu).

In the positive, the method transmits the self-declared Main Menu 220 to a builder module 225 building a menu list and then proceeds with the automatic extraction of the other menus.

In the negative, it then proceeds with the automatic extraction of both the Main Menu and the other menus.

As mentioned, the method extracts (150) the menus on the downloaded web page through a neural network 230 for syntactic detection of menus, a neural network 235 for semantic detection of menus and a neural network 240 for morphological-visual detection of menus, each of which produces a list of menus (in general, a list of lists, if any, of selectable shortcuts pointing to portions inside or outside the resource) ordered according to a prioritisation (i.e. a ranking) of the menus thus extracted (and univocally identified through the relative html tag) that takes into account specific factors for each of the three detection neural networks. By way of example, and not by way of limitation, in the case where the method proceeds with the automatic extraction of both the Main Menu and the other menus, if there are two or more menus on the web pages, the main menu is identified: by the syntactic detection on the basis of the recommendations of the W3C-WAI (Web Accessibility Initiative of the World Wide Web Consortium) for the creation of web pages; by the semantic detection as that containing at least one of the items "home", "homepage" and "main page"; and by the morphological-visual detection as the first menu present on the web page. The extraction process also checks for the presence of sub-menus (e.g., in expandable menus).

In particular, the three neural networks 230, 235 and 240 for menu detection are driven by the ontology 245 corresponding to the first identification of the domain type provided by the syntactic parsing (135) to the domain detector module 215; if the domain type assigned to the web page is "unknown", then no ontology is loaded to drive the three neural networks 230, 235 and 240 for menu detection. Advantageously, the set of ontologies of domain types is updated over time on the basis of the processing carried out by the method according to the invention (to this end, the set of ontologies is managed and updated through a neural network for ontologies which communicates with the domain detector module 215).

It should be noted that other embodiments of the method according to the invention can proceed to the extraction (150) of the menus on the web page downloaded through only one or two neural networks, selected from the group comprising a neural network for syntactic detection, a network neural for semantic detection and a neural network for morphological-visual detection.

Next, the method performs a filtering (155) of the menus provided by the three neural networks 230, 235 and 240 for menu detection. In particular, such filtering is carried out through a neural network 249 for syntactic filtering of menus, that optionally (but not necessarily) receives the results provided by the neural network 230 for syntactic detection of menus, a neural network 255 for semantic filtering of menus, that optionally (but not necessarily) receives the results provided by the neural network 235 for semantic detection of menus, and a neural network 250 for morphological-visual filtering of menus, that optionally (but not necessarily) receives the results provided by the neural network 240 for morphological-visual detection of menus. Such three neural networks for filtering of menus eliminate the menus (in general, the lists, if any, of selectable shortcuts pointing to portions inside or outside the resource) produced by each of the neural networks for menu detection which perform the extraction (150) of the menus which are judged as incorrect, optionally according to heuristic symbolic logics of the other two neural networks for menu detection. By way of example, and not by way of limitation, a candidate menu extracted by the neural network 240 for morphological-visual detection of menus that is composed of a simple sentence that at least one of the other two neural networks for menu detection recognises as not being a list of selectable pointing shortcuts, or a candidate menu extracted by the neural network 230 for syntactic detection of menus that the neural network 235 for semantic detection of menus recognises as composed of options with unlikely semantic consistency and/or that the neural network 240 for morphological-visual detection of menus recognises as composed of options with unlikely morphological-visual distribution in the web page.

It should be noted that other embodiments of the method according to the invention can proceed to filtering the results provided by the extraction (150) of the menus in the downloaded web page (provided through one, two or three neural networks for menu detection), through only one or two neural networks for menu filtering selected from the group comprising a neural network for syntactic filtering of menus, a neural network for semantic filtering of menus and a neural network for morphological-visual filtering of menus.

Subsequently, the builder module 225 of a menu list receives the results obtained with the filtering (155) of the menus (and possibly the self-declared Main Menu 220) and, on the basis of the ontology 245 corresponding to the domain type to which the downloaded web page belongs, produces the list of menus, if any, of the downloaded web page (more generally the list of lists, if any, of selectable shortcuts pointing to portions inside or outside of the resource) ordered according to a prioritisation (ie a ranking) of the menus.

In particular, the three neural networks 249, 250 and 255 for menu filtering are driven by the ontology 245 corresponding to the first identification of the domain type provided by the syntactic parsing (135) to the domain detector module 215; if the domain type assigned to the web page is "unknown", then no ontology is loaded to drive the three neural networks 249, 250 and 255 for menu filtering. In the preferred embodiment of the method according to the invention, in the case where the extraction (150) of the menus, or the filtering (155) of the menus or the builder module 225 building a menu list recognise that the first identification of the domain type provided by the syntactic parsing (135) is incorrect, they provide the domain detector module 215 with a second identification of the domain type and the method is executed again starting from the extraction (150) of the menus wherein it is the ontology 245 of the new domain type that drives the extraction (150) of menus, the filtering (155) of menus and the builder module 225 building a menu list, Subsequently, the method performs the analysis of the non-menu contents of the web page (in general, of the elements different from the lists of selectable shortcuts pointing to portions inside or outside the resource, that in the following are also referred to as content elements), including the forms and/or boxes to be filled, through three neural networks for the detection of non-menu contents and three neural networks for the filtering of non-menu contents similar to what illustrated for the neural networks operating on the menus. Such neural networks for the detection and filtering of non-menu contents analyse all the content of the web page (in general of the resource) that is not part of menus.

In detail, the method extracts (160) the non-menu contents in the downloaded web page through a neural network 260 for syntactic detection of non-menu contents, a neural network 265 for semantic detection of non-menu contents and a neural network 270 for morphological-visual detection of non-menu contents, each of which produces a list of non-menu contents (in general, a list of elements, if any, different from lists of selectable shortcut pointing to portions inside or outside the resource) ordered according to a prioritisation (i.e. a ranking) of the non-menu contents thus extracted (and univocally identified through the relative html tag) that takes into account specific factors for each one of the three neural networks for the detection of non-menu contents.

In particular, the three neural networks 260, 265 and 270 for detecting non-menu contents are driven by the ontology 245 corresponding to the identification of the domain type provided by the detector module 215 on the basis of the first identification provided by the syntactic parsing (135) or any subsequent identification provided by the extraction (150) of the menus or by the filtering (155) of the menus or by the builder module 225 building a menu list. If the domain type assigned to the web page is "unknown", then no ontology is loaded to drive the three detection neural networks 260, 265 and 270.

It should be noted that other embodiments of the method according to the invention can proceed to the extraction (160) of the non-menu contents in the downloaded web page through only one or two neural networks, selected from the group comprising a neural network for syntactic detection of non-menu contents, a neural network for semantic detection of non-menu contents and a neural network for morphological-visual detection of non-menu contents.

Next, the method performs a filtering (165) of non-menu content of the results provided by the three neural networks 260, 265 and 270 for detection of non-menu contents. In particular, such filtering is carried out through a neural network 275 for syntactic filtering of non-menu contents, that optionally (but not necessarily) receives the results provided by the neural network 260 for syntactic detection of non-menu contents, a neural network 280 for semantic filtering of non-menu contents, that optionally (but not necessarily) receives the results provided by the neural network 265 for semantic detection of non-menu contents, and a neural network 285 for morphological-visual filtering of non-menu contents, that optionally (but not necessarily) receives the results provided by the neural network 270 for morphological-visual detection of non-menu contents. Such three neural networks for filtering of non-menu content eliminate non-menu content produced by each one of the neural networks for detection of non-menu content which carry out the extraction (160) of the non-menu content which are judged to be incorrect, optionally according to heuristic symbolic logics of the other two neural networks for detection of non-menu contents.

It should be noted that other embodiments of the method according to the invention can proceed to the filtering of non-menu contents of the results provided by the extraction (160) of the non-menu contents in the downloaded web page (provided by one, two or three neural networks), through only one or two neural networks for filtering of non-menu content selected from the group comprising a neural network for syntactic filtering of non-menu contents, a neural network for semantic filtering of non-menu contents and a neural network for morphological-visual filtering of non-menu contents.

Subsequently, the builder module 290 building structure of menus and non-menu contents receives the results obtained with the filtering (165) of non-menu contents and, on the basis of the ontology 245 corresponding to the domain type to which the downloaded web page belongs, produces the list of non-menu contents, if any, of the downloaded web page (more generally the list of elements, if any, different from lists of selectable shortcut pointing to portions inside or outside the resource) ordered according to a prioritisation (i.e. a ranking) of the non-menu contents. Then, on the basis of the list of non-menu contents, if any, and of the list of menus received by the builder module 225 building a menu list, and again on the basis of the ontology 245 corresponding to the domain type to which the downloaded web page belongs, it builds the final structure of menus and non-menu contents and sends it to a Dialogue Manager that delivers (125) the relative voice prompt (that in the case of forms and/or boxes to be filled provides a dialogue for input and confirmation of the data to be input and/or selected), starting the voice interaction with the user to browse the web page.

Advantageously, the Dialogue Manager can avail of the information stored in the user's profile 210, e.g. for the recognition of the user's voice. Such voice prompt is made considering the usability rules, which limit, for example, the delivery of an item command prompt with a maximum number of items (optionally ranging from 7 to 10). In case of a higher number of items to be provided as options that can be selected through voice commands by the user, the method organises such items in sub-menus, for example by mechanically dividing (i.e. without grouping the items on the basis of their semantic proximity) the number of options by an integer and producing n sub-menus in cascade (e.g., producing through the TTS module the following sentence "I have 18 options, I list them in 6 blocks of 3: item a, item b and item c; item d, item e and item f; . . . "), or by semantically clustering the items in sub-menus of options semantically linked to each other (by way of example, a vector distance analyser can group in a sub-menu the items which have a distance between them not exceeding a threshold value and can deliver as sub-menu item grouping them the parent word that semantically has the minimum distance from all the options of the sub-menu under consideration).

In particular, also the three neural networks 275, 280 and 285 for filtering of non-menu contents are driven by the ontology 245 corresponding to the identification of the domain type provided by the detector module 215; if the domain type assigned to the web page is "unknown", then no ontology is loaded to drive the three neural networks 275, 280 and 285 for filtering of non-menu content. In the preferred embodiment of the method according to the invention, in the case where the extraction (160) of the non-menu contents or the filtering (165) of the non-menu contents recognise that the identification of the domain type provided by the module detector 215 (on the basis of the first identification provided by the syntactic parsing (135) or of the possible subsequent identification provided by the extraction (150) of menus or by the filtering (155) of menus or by the builder module 225 building a menu list) is incorrect, they provide the domain detector module 215 with a third identification of the domain type and the method is executed again starting from the extraction (150) of the menus wherein it is the ontology 245 of the new domain type that drives the extraction (150) of menus, the filtering (155) of menus, the builder module 225 building a menu list, the extraction (160) of non-menu contents, the filtering (165) of non-menu contents and the builder module 290 building menus and non-menu contents.

Also, the builder module 290 building menus and non-menu contents stores the list of menus and the list of non-menu contents in the cache of the processing device for that web page (identified by the URL).

As mentioned, the method according to the invention makes use of Artificial Intelligence, more specifically of Machine Learning and even more specifically of Deep Learning. In fact, the method is based on the use of neural networks and in particular on Deep Learning configured to recognise patterns thanks to the Artificial Neural Networks (ANN).

This is possible thanks to the fact that the ANNs operate in two phases: a first training phase with datasets containing the pattern to be recognised, wherein they store the pattern itself, and a second phase wherein the network is used to search for the pattern in a new dataset. The key point of their effectiveness is a correct training phase, wherein the pattern to be recognized is taught to the neural network. This teaching consists of showing the correct pattern in many different situations to the network. For example, to train a network to recognise a ship, many images of ships, of all types and colors and of all shapes and perspective types, are shown to the network; this activity, for example indicating a ship within a larger image possibly containing several objects, is defined as Tagging.

The method according to the invention provides three neural networks for detection of menus (in general lists of selectable shortcuts pointing to portions inside or outside the resource): a syntactic one, a semantic one and a morphological-visual one. Similarly for the three neural networks for detection of non-menu contents (in general, elements different from lists of selectable shortcut pointing to portions inside or outside the resource). These networks are used in two different modes and moments: the first phase is when menus are searched on the web page, while the second one is when non-menu contents are searched on the web page.

Figure 2:
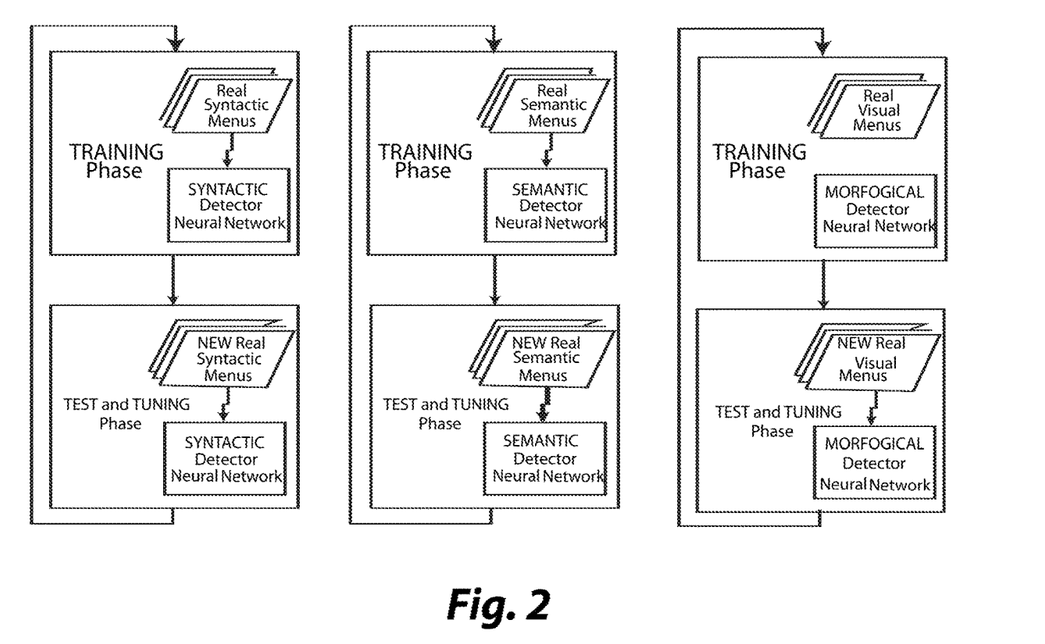
FIG. 2 shows a flow chart of the building phase of neural networks that are part of the preferred embodiment of the system according to the invention.
Figure 3:
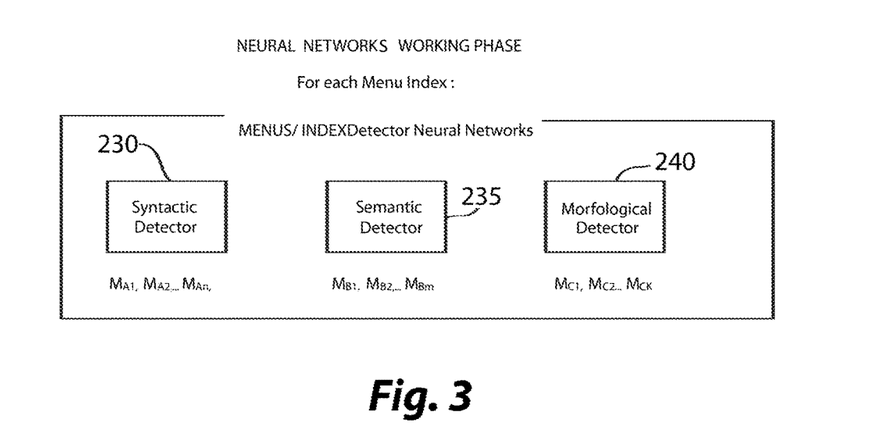
FIG. 3 shows a schematic block diagram of the working phase of the neural networks of FIG. 2.

At the operational level, two different moments are provided for the networks: the construction (Building Phase) and the use (Working phase) schematically shown respectively in FIGS. 2 and 3 for the preferred embodiment of the method according to the invention.

During the operation phase, the neural networks are incrementally improved and refined in an automatic and/or supervised way. The construction is subdivided into two phases: the classic Training phase, where the patterns to be recognized, in very large quantities, are taught to the networks, and a Test and Tuning phase, for calibration and refinement.

For the purposes of tagging of the web content, the method according to the invention exploits a tool configured to semi-automatically tag the menus and contents of the various sites present on the web. These data are used as the first level of training of the neural network, For example, the data patterns at the input of the syntactic neural network for detection of menus in the training phase consist of portions of HTML code related to menus, the data patterns at the input of the semantic neural network for detection of menus in the training phase consist of sets of data tuples (Syntactic/Morphological/Semantic chunks/clusters, Domains, Ontologies), the data patterns at the input of the morphological-visual neural network for detection of menus in the training phase consist of menu images.

Referring to FIG. 3, each one of the three neural networks produces its own list of menu candidates, each one univocally identified through the relative html tag. Namely: the neural network 230 for syntactic detection of menus produces a first list $$M_{A1}, M_{A2}, \ldots M_{An}$$

the neural network 235 for semantic detection of menus produces a second list $$M_{B1}, M_{B2}, \ldots M_{Bm}$$

and the neural network 240 for morphological-visual detection of menus produces a third list $$M_{C1}, M_{C2}, \ldots M_{Ck}$$

After the filtering (155), the set intersection of these three lists may be non-empty, thereby there exist some menus which are candidates for all the three neural networks 230, 235 and 240 for detection of menus: such menus will have more weight in the ordering or ranking of the extracted menus and, consequently, in the preparation phase of the voice prompt by the Dialog Manager. Obviously, the set intersection of these three lists could also be empty, when the three neural networks 230, 235 and 240 for detection of menus are not in agreement.

The builder module 225 of a menu list operates as follows to produce the list of menus ordered according to a prioritisation (i.e. a ranking) of the menus.

Each one of the menus in each list has its own specific confidence value (equal to a real value between 0 and 1) assigned thereto by the relative neural network for detection of menus that represents the probability that, according to the specific neural network, that is a Menu: $w(M_{Ai})$, $w(M_{Bi})$, $w(M_{Ci})$.

Thus, each menu $M_i$ is characterized by a specific overall confidence value $w_{Mi}$, that is a linear combination of such confidence values:

$$w_{Mi} = \alpha_{Dk} * w(M_{Ai}) + \beta_{Dk} * w(M_{Bi}) + \gamma_{Dk} * w(M_{Ci}),$$

where $\alpha_{Dk}$ represents the weight of the neural network 230 for syntactic detection of menus, $\beta_{Dk}$ represents the weight of the neural network 235 for semantic detection of menus of the semantic analyser, and $\gamma_{Dk}$ represents the weight of the neural network 240 for morphological-visual detection of menus (all real values between 0 and 1) depending on the specific ontology 245 of the type domain $D_k$ (possibly equal to "unknown") provided by the domain detector module 215. In fact, in a certain domain $D_k$, governed by a specific ontology 245, the three neural networks 230, 235 and 240 of detection of menus have a differentiated relevance from each other, influencing the values of the weights $\alpha_{Dk}$, $\beta_{Dk}$ and $\gamma_{Dk}$ thereof.

In this way, the builder module 225 building a menu list is able to build the list of menus ordered according to a prioritisation (i.e. a ranking) of the menus on the basis of the overall confidence value $w_{Mi}$ of each one of them.

In this regard, all the menus which, although detected by at least one of the neural networks 230, 235 and 240 for detection of menus, are excluded from the list of ordered menus built by the builder module 225 (and/or the menus having a ranking assigned by the relative neural network for detection of menus the distance of which from the one finally assigned by the builder module 225 is higher than a maximum error threshold), produce a negative feedback on the relative neural network for detection of menus (that will have this Menu as an input negative instance), so as to improve the training of the neural network itself.

In other words, both the construction of the list of the possible menus and the construction of the list of the possible non-menu contents of the web page are executed by the method according to the invention by carrying out at least one analysis selected from the group comprising a syntactic analysis, a semantic analysis and a morphological-visual analysis to determine a clustering (i.e. a grouping) of the elements of the web page in a plurality of homogeneous logical units (thereby menus and non-menu contents are grouped into distinct logical units) and the ranking (i.e. the order of importance) of such homogeneous logical units (thereby, for example, the main menu has a higher ranking than the other menus of the web page, just as a non-main menu content has a higher ranking than other non-menu contents of the web page).

Consequently, the construction of the list of the possible menus gives as result one or more (if any) logical units of menus in each one of which one or more menus of equal importance are clustered and to each one of which a specific ranking is assigned in the set of said one or more (if any) logical units of menus; in this regard, it must noted that menus comprising a large number of items can be rearranged so as to have a lower number (optionally less than or equal to 10, more optionally less than or equal to 7) of primary items in at least some of which a plurality of original items of the menu are group, which are thus considered as belonging to sub-menus corresponding to the primary item.

Similarly, the construction of the list of the possible non-menu contents gives as result one or more (if any) logical units of non-menu contents in each one of which one or more non-menu contents of the page of equal importance are clustered and to each one of which a specific ranking is assigned in the set of said one or more (if any) logical units of non-menu contents.

Subsequently, the method delivers (125) the list of the homogeneous logical units of the menus and non-menu contents of the web page according to their ranking (optionally playing first the list of the menus and then that of the non-menu contents) through the TTS module, and it establishes a dialogue with the user through the TTS and ASR modules, allowing the user to select one of the logical units in the list (possibly even before that the list of homogeneous logical units is completely played).

In the case where the user selects a logical unit of non-menu content comprising a single element (i.e. a single non-menu content) of the web page, the method plays that non-menu content (that in case of forms and/or boxes to be filled provides a dialogue for input and confirmation of the data to be input and/or selected); this also occurs in the case where the homogeneous logical units identified in the web page consist of a single non-menu content, that is therefore played. At the end of playing the non-menu content, the method plays a list of options, including repeating the playing of the non-menu content and returning to a previously visited web page.

In the case where the user selects a logical unit of menu, the method plays the list of items in such menu; this also occurs in the case where the homogeneous logical units identified in the web page consist of a single (main) menu that is thus played. When the selection made by the user is a sub-menu, the dialogue with the user continues with the playing of the list of items in that sub-menu. When the user selects one of the items of the menu played that consists of a hyperlink to another web page, the method returns to execute starting from step 115 of FIG. 1.

To summarize what has been illustrated above by way of mere example, and not by way of limitation, the method according to the invention listens to the request for a resource to be browsed (e.g. a website) by the user, if necessary it makes a disambiguation of such request, searches and opens (i.e. downloads) the resource (e.g. the home page of the requested site), and on the elements of this it carries out at least one of a syntactic analysis, a semantic analysis and a morphological analysis. The analyses carried out are aimed at playing a voice menu for the user, following the theory of usability, with a maximum number of items (optionally variable from 7 to 10) to choose from, where these items represent all the salient contents of the web page under consideration, which include salient menus and salient non-menu contents. In other words, the analyses carried out concur and cooperate to perform a syntactic/semantic clustering and a prioritisation (i.e. a ranking) of the elements, i.e. menus and non-menu contents, of the web page under consideration.

The results of each analysis are compared and/or combined with the results of the other analysis/analyses to produce a sort of voice meta-menu that best corresponds to the combination of the performed analyses.

In a specific embodiment of the method according to the invention, the user can also make a voice search on a topic instead of a request for browsing a website. The method, through a voice dialogue through the TTS and ASR modules, leads the user with the necessary dialogue cycles to the web page or content/information sought.

The method can be configured to operate independently from the user with whom it interacts, who thus acts in an anonymous/generic mode, or to operate taking into account the user's profile, wherein the method can record user characteristic data, for example establishing a dialogue to acquire such characteristic data (e.g., data relating to one or more interests of the user). Obviously, in the case where the user's profile is taken into account, the method permits optimization of browsing.

Also, it must be noted that the ontology and the performed analyses may be function of the language of the web page, that is easily identified through known techniques.

Advantageously, for the extraction of the elements and the browsing of a resource, the preferred embodiment of the method according to the invention implements a segmentation technique of the resource itself.

Figure 4:
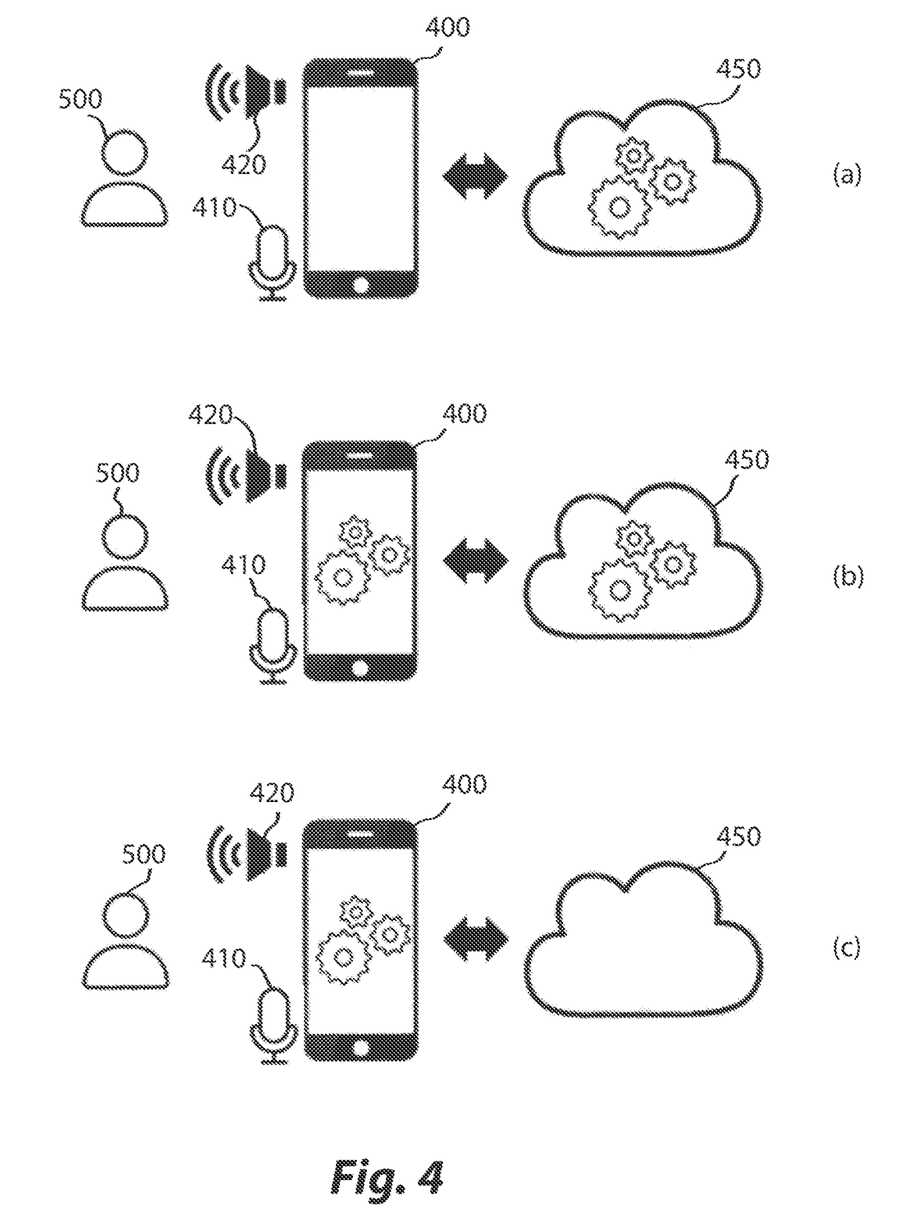
FIG. 4 shows three variants of the preferred embodiment of the system according to the invention.

With reference to FIG. 4, it can be observed that the method according to the invention can be executed by a system comprising a processing device 400 (e.g., a computer, a smartphone or a tablet), equipped with a microphone 410 and audio playing electronic devices 420, with which a user 500 vocally interacts, and one or more servers 450 advantageously in cloud to which the processing device 400 is able to connect. As shown in FIG. 4a, the method can be executed entirely in cloud (with the exception of the voice interaction with the user 500 that is performed by the processing device 400 controlled by said one or more servers 450). Alternatively, as shown in FIG. 4b, the method can be executed partially in cloud and partially on the processing device 400. Alternatively, as shown in FIG. 4c, the method can be executed entirely by the processing device 400 (that may possibly connect to said one or more servers 450 to transmit data relating to the processing carried out or to receive software updates).

In particular, in the case of FIGS. 4a and 4b, the system can be based on an optimized management method of speech recognition and speech synthesis in cloud, such as the one disclosed in the Italian patent No. 102012902071971.

The preferred embodiments of this invention have been described and a number of variations have been suggested hereinbefore, but it should be understood that those skilled in the art can make other variations and changes without so departing from the scope of protection thereof, as defined by the attached claims.

The invention claimed is:

1. Computer-implemented method of browsing a resource through voice interaction comprising the following steps:
A. acquiring from a user a request aimed at browsing a resource;
B. downloading the requested resource;
C. performing a syntactic parsing of the downloaded resource;
D. when the downloaded resource includes at least one selectable shortcut pointing to a portion inside or outside the downloaded resource, extracting from the downloaded resource one or more lists of selectable shortcuts pointing to portions inside or outside the downloaded resource through at least one analysis of extraction of lists of selectable shortcuts of the downloaded resource selected from the group consisting of:
   a syntactic analysis of extraction of lists of selectable shortcuts, wherein said syntactic analysis of extraction of lists of selectable shortcuts is performed through a neural network for syntactic detection of lists of selectable shortcuts,
   a semantic analysis of extraction of lists of selectable shortcuts, wherein said semantic analysis of extraction of lists of selectable shortcuts is performed through a neural network for semantic detection of lists of selectable shortcuts, and
   a morphological-visual analysis of extraction of lists of selectable shortcuts, wherein said morphological-visual analysis of extraction of lists of selectable shortcuts is performed through a neural network for morphological-visual detection of lists of selectable shortcuts,
   wherein said at least one analysis of extraction of lists of selectable shortcuts of the downloaded resource is performed on the basis of an ontology corresponding to a type of resource provided by a resource type detector module;
E. when the downloaded resource includes at least one selectable shortcut pointing to a portion inside or outside the downloaded resource, on the basis of the ontology corresponding to the type of resource provided by the resource type detector module, building a shortcut list comprising one or more of said one or more lists of selectable shortcuts extracted in step D from the downloaded resource, wherein said one or more lists of selectable shortcuts are ordered in the shortcut list according to a list prioritisation;
F. extracting from the downloaded resource one or more content elements different from lists of selectable shortcuts pointing to portions inside or outside the downloaded resource through at least one analysis of extraction of content elements of the downloaded resource selected from the group consisting of:
   a syntactic analysis of extraction of content elements, wherein said syntactic analysis of extraction of content elements is performed through a neural network for syntactic detection of content elements,
   a semantic analysis of extraction of content elements, wherein said semantic analysis of extraction of content elements is performed through a neural network for semantic detection of content elements, and
   a morphological-visual analysis of extraction of content elements, wherein said morphological-visual analysis of extraction of content elements is performed through a neural network for morphological-visual detection of content elements, wherein said at least one analysis of content elements of the downloaded resource is performed on the basis of the ontology corresponding to the type of resource provided by the resource type detector module;
G. on the basis of the ontology corresponding to the type of resource provided by the resource type detector module, building a content list comprising one or more of said one or more content elements extracted in step F from the downloaded resource, wherein said one or more content elements are ordered in the content list according to a content element prioritisation;
H. on the basis of the shortcut list built in step E when the downloaded resource includes at least one selectable shortcut pointing to a portion inside or outside the downloaded resource, and of the content list built in step G, and on the basis of the ontology corresponding to the type of resource provided by a resource type detector module, building a final structure of lists of selectable shortcuts and of content elements;

I. playing a voice prompt based on the final structure of lists of selectable shortcuts and of content elements and starting a voice interaction with the user for browsing the resource;

wherein:

said one or more lists of selectable shortcuts extracted in step D are filtered through at least one analysis of filtering of lists of selectable shortcuts of the downloaded resource selected from the group consisting of:
a syntactic analysis of filtering of lists of selectable shortcuts, wherein said syntactic analysis of filtering of lists of selectable shortcuts is performed through a neural network for syntactic filtering of lists of selectable shortcuts,
a semantic analysis of filtering of lists of selectable shortcuts, wherein said semantic analysis of filtering of lists of selectable shortcuts is performed through a neural network for semantic filtering of lists of selectable shortcuts, and
a morphological-visual analysis of filtering of lists of selectable shortcuts, wherein said morphological-visual analysis of filtering of lists of selectable shortcuts is performed through a neural network for morphological-visual filtering of lists of selectable shortcuts, wherein said at least one analysis of filtering of lists of selectable shortcuts of the downloaded resource is performed on the basis of the ontology corresponding to the type of resource provided by the resource type detector module; and said one or more content elements extracted in step F are filtered through at least one analysis of filtering of content elements of the downloaded resource selected from the group consisting of:
a syntactic analysis of filtering of content elements, wherein said syntactic analysis of filtering of content elements is performed through a neural network for syntactic filtering of content elements,
a semantic analysis of filtering of content elements, wherein said semantic analysis of filtering of content elements is performed through a neural network for semantic filtering of content elements, and
a morphological-visual analysis of filtering of content elements, wherein said morphological-visual analysis of filtering of content elements is performed through a neural network for morphological-visual filtering of content elements, wherein said at least one analysis of filtering of content elements of the downloaded resource is performed on the basis of the ontology corresponding to the type of resource provided by the resource type detector module.

2. Computer-implemented method according to claim 1, wherein:
the resource type detector module receives in step C a first identification of the type of resource,
in step D, in the case where said at least one analysis of extraction of lists of selectable shortcuts of the downloaded resource recognises that said first identification is wrong, the resource type detector module receives a second identification of the type of resource, and execution of step D is repeated, wherein said at least one analysis of extraction of lists of selectable shortcuts of the downloaded resource is performed on the basis of an ontology corresponding to the second identification of the type of resource, and in step F, in the case where the resource type detector module has not received a second identification of the type of resource and said at least one analysis of extraction of content elements of the downloaded resource recognises that said first identification is wrong, or in the case where the resource type detector module has received a second identification of the type of resource and said at least one analysis of extraction of content elements of the downloaded resource recognises that said second identification is wrong, the resource type detector module receives a third identification of the type of resource, and both execution of step D, wherein said at least one analysis of extraction of lists of selectable shortcuts of the downloaded resource is performed on the basis of an ontology corresponding to the third identification of the type of resource, and execution of step F, wherein said at least one analysis of extraction of content elements of the downloaded resource is performed on the basis of the ontology corresponding to the third identification of the type of resource.

3. Computer-implemented method according to claim 1, wherein, in the case where in step C a main list of selectable shortcuts is identified on the basis of a syntactic self-declaration, in step E the list comprising one or more lists of selectable shortcuts is built including said main list of selectable shortcuts identified in step C as said main list of selectable shortcuts.

4. Computer-implemented method according to claim 1, wherein, in step B, it is checked whether the downloaded resource has been browsed in a time interval preceding the request acquired in step A and:
if yes, the method loads the final structure of lists of selectable shortcuts and of content elements previously built for said downloaded resource and skips to step I, otherwise
if not, the method proceeds to step C.

5. Computer-implemented method according to claim 1, wherein immediately after step B spurious elements in the form of advertising contents, if any, are eliminated from the resource and wherein between step C and step D multimedia elements, if any, are managed by a Multimedia Detector/Manager module.

6. Computer-implemented method according to claim 1, wherein in step A the request aimed at browsing a resource is analysed and, if the method recognises that it needs additional information, the method institutes a dialogue with the user to obtain said additional information.

7. Computer-implemented method according to claim 1, wherein step I is performed taking account of information stored in a user profile.

8. Computer-implemented method according to claim 7, wherein said information stored in the user profile are information for a user voice recognition.

9. Computer-implemented method according to claim 1, wherein between step A and step B a search of the requested resource is performed.

10. Computer-implemented method according to claim 9, wherein the search of the requested resource is stored in a user profile.

11. Computer-implemented method according to claim 1, wherein the resource is selected from the group consisting of:
a web page, thereby the lists of selectable shortcuts pointing to portions inside or outside the downloaded resource consist of menus of the web page and the content elements are non-menu contents of the web page;
a document, thereby the lists of selectable shortcuts pointing to portions inside or outside the downloaded resource consist of indexes or summaries of the document; and
an app.

12. System comprising a processing device, provided with microphone and at least one electronic audio playing device, and one or more servers, optionally one or more cloud servers, with which the processing device is configured to connect, wherein the processing device and/or said one or more servers are configured to perform a computer-implemented method of browsing a resource through voice interaction comprising the following steps:
   A. acquiring from a user a request aimed at browsing a resource;
   B. downloading the requested resource;
   C. performing a syntactic parsing of the downloaded resource;
   D. when the downloaded resource includes at least one selectable shortcut pointing to a portion inside or outside the downloaded resource, extracting from the downloaded resource one or more lists of selectable shortcuts pointing to portions inside or outside the downloaded resource through at least one analysis of extraction of lists of selectable shortcuts of the downloaded resource selected from the group consisting of:
      a syntactic analysis of extraction of lists of selectable shortcuts, wherein said syntactic analysis of extraction of lists of selectable shortcuts is performed through a neural network for syntactic detection of lists of selectable shortcuts,
      a semantic analysis of extraction of lists of selectable shortcuts, wherein said semantic analysis of extraction of lists of selectable shortcuts is performed through a neural network for semantic detection of lists of selectable shortcuts, and
      a morphological-visual analysis of extraction of lists of selectable shortcuts, wherein said morphological-visual analysis of extraction of lists of selectable shortcuts is performed through a neural network for morphological-visual detection of lists of selectable shortcuts,
   wherein said at least one analysis of extraction of lists of selectable shortcuts of the downloaded resource is performed on the basis of an ontology corresponding to a type of resource provided by a resource type detector module;
   E. when the downloaded resource includes at least one selectable shortcut pointing to a portion inside or outside the downloaded resource, on the basis of the ontology corresponding to the type of resource provided by the resource type detector module, building a shortcut list comprising one or more of said one or more lists of selectable shortcuts extracted in step D from the downloaded resource, wherein said one or more lists of selectable shortcuts are ordered in the shortcut list according to a list prioritisation;
   F. extracting from the downloaded resource one or more content elements different from lists of selectable shortcuts pointing to portions inside or outside the downloaded resource through at least one analysis of extraction of content elements of the downloaded resource selected from the group consisting of:
      a syntactic analysis of extraction of content elements, wherein said syntactic analysis of extraction of content elements is performed through a neural network for syntactic detection of content elements,
      a semantic analysis of extraction of content elements, wherein said semantic analysis of extraction of content elements is performed through a neural network for semantic detection of content elements, and
      a morphological-visual analysis of extraction of content elements, wherein said morphological-visual analysis of extraction of content elements is performed through a neural network for morphological-visual detection of content elements,
   wherein said at least one analysis of content elements of the downloaded resource is performed on the basis of the ontology corresponding to the type of resource provided by the resource type detector module;
   G. on the basis of the ontology corresponding to the type of resource provided by the resource type detector module, building a content list comprising one or more of said one or more content elements extracted in step F from the downloaded resource, wherein said one or more content elements are ordered in the content list according to a content element prioritisation;
   H. on the basis of the shortcut list built in step E when the downloaded resource includes at least one selectable shortcut pointing to a portion inside or outside the downloaded resource, and of the content list built in step G, and on the basis of the ontology corresponding to the type of resource provided by a resource type detector module, building a final structure of lists of selectable shortcuts and of content elements;
   I. playing a voice prompt based on the final structure of lists of selectable shortcuts and of content elements and starting a voice interaction with the user for browsing the resource;
wherein:
said one or more lists of selectable shortcuts extracted in step D are filtered through at least one analysis of filtering of lists of selectable shortcuts of the downloaded resource selected from the group consisting of:
   a syntactic analysis of filtering of lists of selectable shortcuts, wherein said syntactic analysis of filtering of lists of selectable shortcuts is performed through a neural network for syntactic filtering of lists of selectable shortcuts,
   a semantic analysis of filtering of lists of selectable shortcuts, wherein said semantic analysis of filtering of lists of selectable shortcuts is performed through a neural network for semantic filtering of lists of selectable shortcuts, and
   a morphological-visual analysis of filtering of lists of selectable shortcuts, wherein said morphological-visual analysis of filtering of lists of selectable shortcuts is performed through a neural network for morphological-visual filtering of lists of selectable shortcuts,
   wherein said at least one analysis of filtering of lists of selectable shortcuts of the downloaded resource is performed on the basis of the ontology corresponding to the type of resource provided by the resource type detector module; and
said one or more content elements extracted in step F are filtered through at least one analysis of filtering of content elements of the downloaded resource selected from the group consisting of:
   a syntactic analysis of filtering of content elements, wherein said syntactic analysis of filtering of content elements is performed through a neural network for syntactic filtering of content elements, a semantic analysis of filtering of content elements, wherein said semantic analysis of filtering of content elements is performed through a neural network for semantic filtering of content elements, and a morphological-visual analysis of filtering of content elements, wherein said morphological-visual analysis of filtering of content elements is performed through a neural network for morphological-visual filtering of content elements, wherein said at least one analysis of filtering of content elements of the downloaded resource is performed on the basis of the ontology corresponding to the type of resource provided by the resource type detector module.

13. System according to claim 12, wherein said one or more servers include one or more cloud servers.

14. Set of one or more non-transitory computer-readable storage media having stored thereon a set of one or more computer programs comprising instructions which, when executed by one or more processing units, cause said one or more processing units to carry out the computer-implemented method of browsing a resource through voice interaction comprising the following steps:

A. acquiring from a user a request aimed at browsing a resource;
B. downloading the requested resource;
C. performing a syntactic parsing of the downloaded resource;
D. when the downloaded resource includes at least one selectable shortcut pointing to a portion inside or outside the downloaded resource, extracting from the downloaded resource one or more lists of selectable shortcuts pointing to portions inside or outside the downloaded resource through at least one analysis of extraction of lists of selectable shortcuts of the downloaded resource selected from the group consisting of:
   a syntactic analysis of extraction of lists of selectable shortcuts, wherein said syntactic analysis of extraction of lists of selectable shortcuts is performed through a neural network for syntactic detection of lists of selectable shortcuts,
   a semantic analysis of extraction of lists of selectable shortcuts, wherein said semantic analysis of extraction of lists of selectable shortcuts is performed through a neural network for semantic detection of lists of selectable shortcuts, and
   a morphological-visual analysis of extraction of lists of selectable shortcuts, wherein said morphological-visual analysis of extraction of lists of selectable shortcuts is performed through a neural network for morphological-visual detection of lists of selectable shortcuts,
   wherein said at least one analysis of extraction of lists of selectable shortcuts of the downloaded resource is performed on the basis of an ontology corresponding to a type of resource provided by a resource type detector module;
E. when the downloaded resource includes at least one selectable shortcut pointing to a portion inside or outside the downloaded resource, on the basis of the ontology corresponding to the type of resource provided by the resource type detector module, building a shortcut list comprising one or more of said one or more lists of selectable shortcuts extracted in step D from the downloaded resource, wherein said one or more lists of selectable shortcuts are ordered in the shortcut list according to a list prioritisation;
F. extracting from the downloaded resource one or more content elements different from lists of selectable shortcuts pointing to portions inside or outside the downloaded resource through at least one analysis of extraction of content elements of the downloaded resource selected from the group consisting of:
   a syntactic analysis of extraction of content elements, wherein said syntactic analysis of extraction of content elements is performed through a neural network for syntactic detection of content elements,
   a semantic analysis of extraction of content elements, wherein said semantic analysis of extraction of content elements is performed through a neural network for semantic detection of content elements, and
   a morphological-visual analysis of extraction of content elements, wherein said morphological-visual analysis of extraction of content elements is performed through a neural network for morphological-visual detection of content elements,
   wherein said at least one analysis of content elements of the downloaded resource is performed on the basis of the ontology corresponding to the type of resource provided by the resource type detector module;
G. on the basis of the ontology corresponding to the type of resource provided by the resource type detector module, building a content list comprising one or more of said one or more content elements extracted in step F from the downloaded resource, wherein said one or more content elements are ordered in the content list according to a content element prioritisation;
H. on the basis of the shortcut list built in step E when the downloaded resource includes at least one selectable shortcut pointing to a portion inside or outside the downloaded resource, and of the content list built in step G, and on the basis of the ontology corresponding to the type of resource provided by a resource type detector module, building a final structure of lists of selectable shortcuts and of content elements;
I. playing a voice prompt based on the final structure of lists of selectable shortcuts and of content elements and starting a voice interaction with the user for browsing the resource;

wherein:
said one or more lists of selectable shortcuts extracted in step D are filtered through at least one analysis of filtering of lists of selectable shortcuts of the downloaded resource selected from the group consisting of:
a syntactic analysis of filtering of lists of selectable shortcuts, wherein said syntactic analysis of filtering of lists of selectable shortcuts is performed through a neural network for syntactic filtering of lists of selectable shortcuts,
a semantic analysis of filtering of lists of selectable shortcuts, wherein said semantic analysis of filtering of lists of selectable shortcuts is performed through a neural network for semantic filtering of lists of selectable shortcuts, and
a morphological-visual analysis of filtering of lists of selectable shortcuts, wherein said morphological-visual analysis of filtering of lists of selectable shortcuts is performed through a neural network for morphological-visual filtering of lists of selectable shortcuts,
wherein said at least one analysis of filtering of lists of selectable shortcuts of the downloaded resource is performed on the basis of the ontology corresponding to the type of resource provided by the resource type detector module; and said one or more content elements extracted in step F are filtered through at least one analysis of filtering of content elements of the downloaded resource selected from the group consisting of:

a syntactic analysis of filtering of content elements, wherein said syntactic analysis of filtering of content elements is performed through a neural network for syntactic filtering of content elements, a semantic analysis of filtering of content elements, wherein said semantic analysis of filtering of content elements is performed through a neural network for semantic filtering of content elements, and a morphological-visual analysis of filtering of content elements, wherein said morphological-visual analysis of filtering of content elements is performed through a neural network for morphological-visual filtering of content elements, wherein said at least one analysis of filtering of content elements of the downloaded resource is performed on the basis of the ontology corresponding to the type of resource provided by the resource type detector module.

\* \* \* \* \*